US010630925B1

(12) United States Patent
Li et al.

(10) Patent No.: US 10,630,925 B1
(45) Date of Patent: Apr. 21, 2020

(54) DEPTH DETERMINATION USING POLARIZATION OF LIGHT AND CAMERA ASSEMBLY WITH AUGMENTED PIXELS

(71) Applicant: Facebook Technologies, LLC, Menlo Park, CA (US)

(72) Inventors: Fengqiang Li, Redmond, WA (US); Michael Hall, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/208,086

(22) Filed: Dec. 3, 2018

(51) Int. Cl.
*H04N 5/369* (2011.01)
*H04N 5/3745* (2011.01)

(52) U.S. Cl.
CPC ..... *H04N 5/36965* (2018.08); *H04N 5/37452* (2013.01)

(58) Field of Classification Search
CPC ........... H04N 5/36965; H04N 5/37452; H04N 13/254; H04N 13/344; H04N 13/271; H04N 13/296; H04N 13/366; H04N 5/35536; H04N 5/35572
See application file for complete search history.

(56) References Cited

U.S. PATENT DOCUMENTS

| 5,016,282 | A  | 5/1991  | Tomono et al. |
| 8,824,779 | B1 | 9/2014  | Smyth         |
| 9,555,589 | B1 | 1/2017  | Ambur et al.  |
| 9,581,744 | B1 | 2/2017  | Yun et al.    |
| 9,581,827 | B1 | 2/2017  | Wong et al.   |
| 9,737,209 | B2 | 8/2017  | Gramatikov et al. |
| 9,829,710 | B1 | 11/2017 | Newell et al. |
| 9,835,777 | B2 | 12/2017 | Ouderkirk et al. |
| 10,108,261 | B1 | 10/2018 | Hall et al.  |
| 10,146,055 | B2 | 12/2018 | Ouderkirk    |

(Continued)

FOREIGN PATENT DOCUMENTS

WO   WO 2013/066634 A1   5/2013

OTHER PUBLICATIONS

G. Yahav, T. Reiner and S. Lee, "A Low Cost 3D Tracker for Parallax Barrier Display," 2007 3DTV Conference, Kos Island, May 2007, pp. 1-4. doi: 10.1109/3DTV.2007.4379431.*

(Continued)

*Primary Examiner* — Mohammed S Rahaman
(74) *Attorney, Agent, or Firm* — Fenwick & West LLP (57) ABSTRACT

A depth camera assembly (DCA) for depth sensing of a local area. The DCA includes a light source assembly, a camera assembly, and a controller. The light source assembly projects pulses of light into the local area, each pulse having a respective polarization type. The camera assembly images a portion of the local area illuminated with the pulses of light. The camera assembly includes a plurality of augmented pixels, each augmented pixel having a plurality of gates and local storage locations. An exposure interval of the camera assembly is divided into intervals and some of the intervals are synchronized to the projected pulses of light such that each respective local storage location stores image data associated with a different polarization type. The controller determines depth information for the local area based in part on the polarization types associated with the image data stored in respective local storage locations.

20 Claims, 6 Drawing Sheets

(56) References Cited

U.S. PATENT DOCUMENTS

| | | | |
|---|---|---|---|
| 2011/0050885 A1 | 3/2011 | McEldowney | |
| 2012/0075432 A1* | 3/2012 | Bilbrey | G06T 7/593 |
| | | | 348/48 |
| 2012/0154467 A1* | 6/2012 | Hwang | G09G 3/3659 |
| | | | 345/694 |
| 2012/0320219 A1* | 12/2012 | David | G01S 7/483 |
| | | | 348/169 |
| 2014/0285429 A1 | 9/2014 | Simmons | |
| 2015/0193920 A1 | 7/2015 | Knee et al. | |
| 2016/0202484 A1 | 7/2016 | Ouderkirk | |
| 2016/0225154 A1 | 8/2016 | Zhou et al. | |
| 2017/0115395 A1* | 4/2017 | Grauer | G01S 7/4868 |
| 2017/0180713 A1* | 6/2017 | Trail | G01S 17/89 |
| 2017/0192499 A1* | 7/2017 | Trail | G06F 3/013 |
| 2017/0195653 A1* | 7/2017 | Trail | H04N 13/254 |
| 2018/0038944 A1* | 2/2018 | Hellmig | G01S 17/89 |
| 2018/0063390 A1* | 3/2018 | Trail | G06F 3/011 |
| 2018/0100731 A1* | 4/2018 | Pau | H04N 13/239 |
| 2018/0196509 A1* | 7/2018 | Trail | G02B 27/0093 |
| 2018/0227567 A1* | 8/2018 | Chao | G01S 7/499 |
| 2018/0239146 A1 | 8/2018 | Bierhuizen et al. | |

OTHER PUBLICATIONS

Kadambi, A. et al., "Polarized 3D: High-Quality Depth Sensing with Polarization Cues," The IEEE International Conference on Computer Vision (ICCV), 2015, pp. 3370-3378.
PCT International Search Report and Written Opinion, PCT Application No. PCT/US2018/040771, dated Nov. 16, 2018, 20 pages.

* cited by examiner

DEPTH DETERMINATION USING POLARIZATION OF LIGHT AND CAMERA ASSEMBLY WITH AUGMENTED PIXELS

BACKGROUND

The present disclosure generally relates to depth sensing, and specifically relates to depth determination using polarization of light and a camera assembly with augmented pixels each having multiple gates and local storage locations.

To achieve compelling user experience in artificial reality systems, it is essential to rely on an accurate and efficient camera for sensing a three-dimensional (3D) surrounding environment. However, it is challenging to design a depth camera having a high performance and low computational power, which is also robust to the environment, flexible to operate, and have a compact form factor. Moreover, conventional methods for depth sensing typically involve either a triangulation or time of flight based depth determination, and have several drawbacks. For example, the triangulation based methods generally have a high computational cost to generate a depth map that involves rectification and searching for corresponding points using a pair of stereo images. The depth resolution achieved with the triangulation-based methods also relies on a baseline (e.g., distance between source and camera), and a size of the baseline increases with increasing depth. The time-of-flight methods for depth sensing experience a limited lateral resolution due to a limited number of pixels in conventional sensors.

SUMMARY

A depth camera assembly (DCA) determines depth information associated with one or more objects in a local area. The DCA comprises a light source assembly, a camera assembly, and a controller. The light source assembly is configured to project pulses of light into a local area, wherein each pulse of light has a respective polarization type of a plurality of polarization types. The camera assembly is configured to image a portion of the local area illuminated with the pulses of light. The camera assembly includes a plurality of augmented pixels, wherein each augmented pixel has a plurality of gates and at least some of the gates have a respective local storage location. An exposure interval of the camera assembly is divided into intervals and some of the intervals are synchronized to the projected pulses of light such that each respective local storage location stores image data associated with a different polarization type. The controller is configured to determine depth information for the local area based in part on the polarization types associated with the image data stored in respective local storage locations.

An eyeglass-type platform representing a near-eye display (NED) or some other type of a headset can further integrate the DCA. The NED further includes a display and an optical assembly. The NED may be part of an artificial reality system. The display of the NED is configured to emit image light. The optical assembly of the NED is configured to direct the image light to an eye-box of the NED corresponding to a location of a user's eye. The image light may comprise the depth information for the local area determined by the DCA.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a near-eye display (NED), a mobile device or computing system, or any other hardware platform capable of providing artificial reality content to one or more viewers.

A depth camera assembly (DCA) for determining depth information for a local area surrounding some or all of the DCA is presented herein. The DCA includes a light source assembly and a camera assembly. The light source assembly emits light at different polarizations. The camera assembly includes a sensor having augmented pixels that each have a plurality of gates that have a plurality of associated local storage locations. There is at least one gate for each of the different polarizations emitted by the light source assembly. The DCA images a local area over an exposure interval. During the time period the light source assembly emits light at different polarizations, and each polarization is synchronized to an exposure window of a particular gate. The augmented pixels cycle through different gates such that over the time period a plurality of exposures are stored in the local storage locations associated with their respective gates, and each exposure is associated with light captured at a particular polarization. The information in the local storage locations is read out as a set of images corresponding to captures at different polarizations, and the DCA determines depth information of the local area using the set of images. As the local storage locations associated with their respective gates are read once per exposure interval of the camera assembly, a speed of the DCA presented herein is faster than that of conventional polarization-based DCAs. In a conventional polarization-based DCA with N polarization types, there are N readouts—one readout for each polarization type. In contrast, for the DCA presented herein, there is a single readout for the N polarization types. The DCA presented herein also reduces motion blur relative to conventional polarization-based DCAs because each local storage location of an augmented pixel stores image data of a different polarization type during multiple capture intervals interleaved with other capture intervals of one or more other remaining local storage locations of the augmented pixel.

The DCA may be integrated into a NED. The NED may be part of an artificial reality system. The NED may also be referred to as a headset, e.g., a head-mounted display (HMD). The NED further includes a display and an optical assembly. The display is configured to emit image light. The optical assembly is configured to direct the image light to an eye-box of the NED corresponding to a location of a user's eye, the image light comprising the depth information for the local area determined by the DCA.

Figure 1:
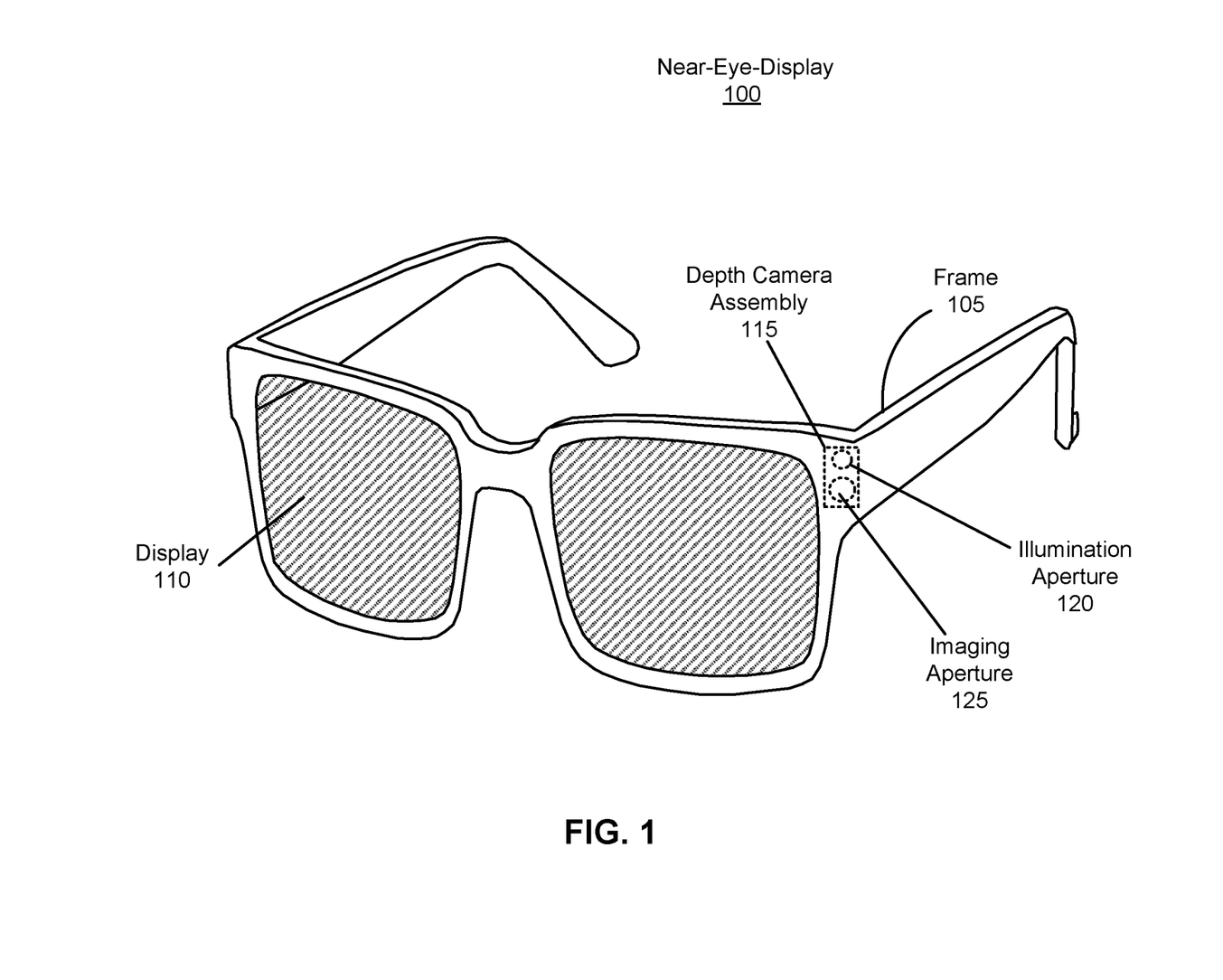
FIG. 1 is a diagram of a near-eye-display (NED), in accordance with one or more embodiments.

FIG. 1 is a diagram of a NED 100, in accordance with one or more embodiments. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 may be part of an artificial reality system (not shown). The NED 100 is generally configured to operate as an artificial reality NED. In some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. The display 110 generates an image light to present media to an eye of the user.

The NED 100 further includes a DCA 115 configured to determine depth information of a local area surrounding some or all of the NED 100. The NED 100 also includes an illumination aperture 120 and an imaging aperture 125, and a light source assembly of the DCA 115 emits light (e.g., polarized light, structured light, etc.) through the illumination aperture 120. A camera assembly of the DCA 115 captures light from the light source assembly that is reflected from the local area through the imaging aperture 125. Light emitted from the light source assembly of the DCA 115 through the illumination aperture 120 may comprise pulses of light, wherein each pulse of light has a respective polarization type of a plurality of polarization types, as discussed in more detail in conjunction with FIGS. 2-5. Light reflected from the local area through the imaging aperture 125 and captured by the camera assembly of the DCA 115 may comprise at least a portion of the reflected pulses of light having respective polarization types, as also discussed in more detail in conjunction with FIGS. 2-5.

Position of the DCA 115 within the NED 100 shown in FIG. 1 is only illustrative, and the DCA 115 can be located elsewhere on the frame 105, e.g., on any temple of the frame 105. Also, components of the DCA 115 can be located on different locations of the frame 105, e.g., the light source assembly and the illumination aperture 120 can be located on one temple of the frame 105 whereas the camera assembly and the imaging aperture 125 can be located on another temple of the frame 105. The NED 100 shown in FIG. 1 is only an example of an artificial reality system. In alternate embodiments (not shown in FIG. 1), the DCA 115 could be part of an artificial reality system that includes a HMD, e.g., the DCA 115 can be integrated into the HMD.

In one embodiment, the DCA 115 presented in this disclosure provides the determined depth information to a console coupled to the NED 100. The console is then configured to generate content for presentation on an electronic display of the NED 100, based on the depth information. In another embodiment, the DCA 115 presented herein provides the determined depth information to a module of the NED 100 that generates content for presentation on the electronic display of the NED 100, based on the depth information. In an alternate embodiment, the DCA 115 is integrated into the NED 100 as part of an AR system. In this case, the NED 100 may be configured to sense and display objects behind a head of a user wearing the NED 100 or display objects recorded previously. In yet other embodiments, the DCA 115 is integrated into a base station or a sensor bar external to the NED 100. In this case, the DCA 115 may be configured to sense various body parts of a user wearing the NED 100, e.g., the user's lower body. In yet other embodiment, the DCA 115 is configured as part of a controller or as part of a capture system to capture VR content, AR content, and/or MR content.

In some embodiments, the DCA 115 presented herein and mounted on the NED 100 (or integrated into a frame of the NED 100) can be configured for hand tracking of a user wearing the NED 100. In other embodiments, the DCA 115 presented herein is configured to generate a hand gesture recognition input. In yet other embodiments, the DCA 115 presented herein is configured to determine object occlusion information, which may be displayed on the display 110. In yet other embodiments, the DCA 115 presented herein is configured for depth reconstruction. Alternatively, the DCA 115 presented herein can be part of a device external to a NED 100, and can be configured for recording the geometry of a user or a local area, hand-tracking, eye-tracking, etc.

Figure 2:
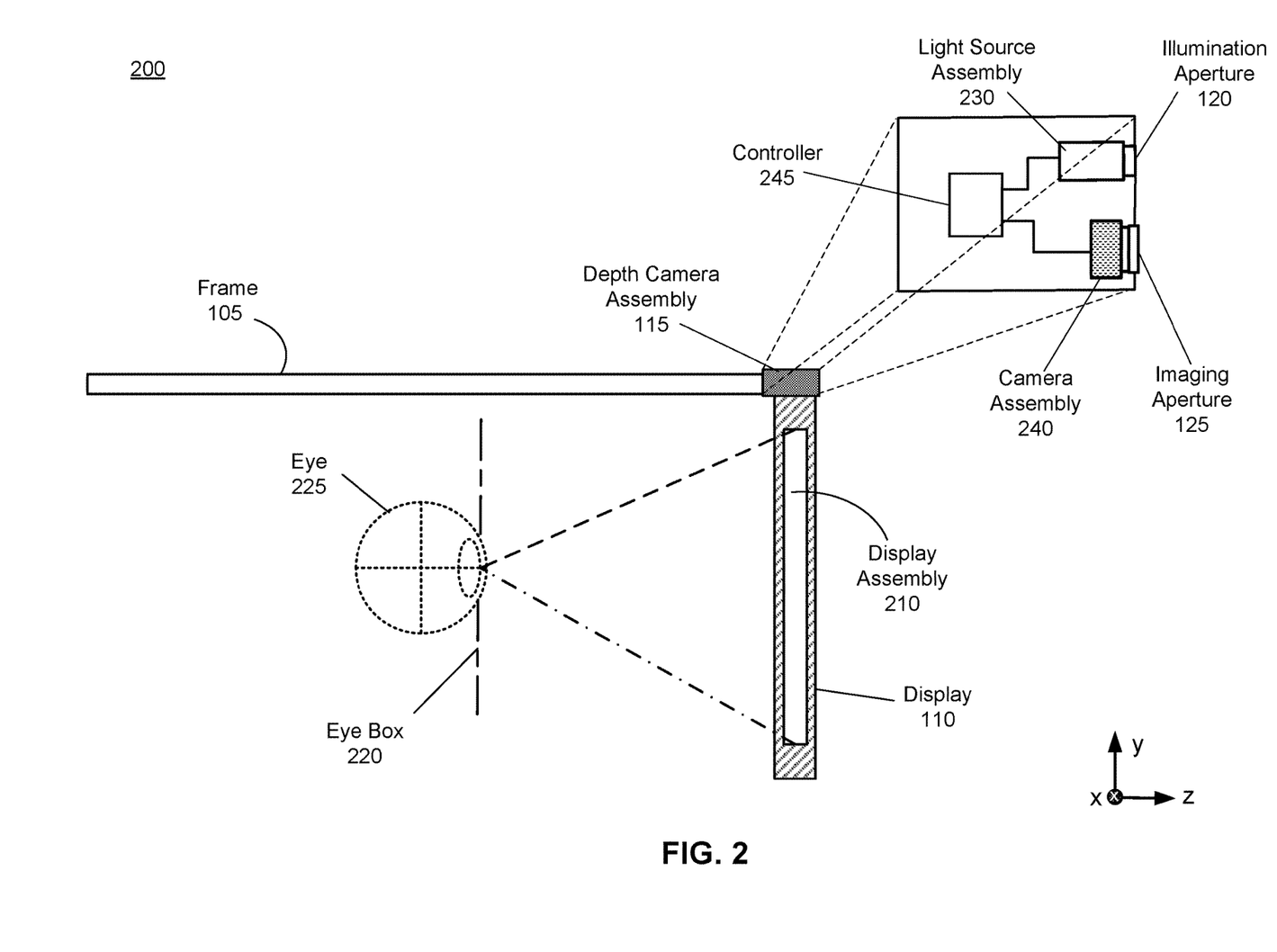
FIG. 2 is a cross-section of an eyewear of the NED in FIG. 1, which may include a depth camera assembly (DCA), in accordance with one or more embodiments.

FIG. 2 is a cross section 200 of an eyewear of the NED 100 illustrated in FIG. 1, in accordance with one or more embodiments. The cross section 200 includes at least one display assembly 210 integrated into the display 110, an eye box 220, and the DCA 115. The eye box 220 is a location where an eye 225 is positioned when a user wears the NED 100. In some embodiments, the frame 105 may represent a frame of eye-wear glasses. For purposes of illustration, FIG. 2 shows the cross section 200 associated with a single eye 225 and a single display assembly 210, but in alternative embodiments not shown, another display assembly which is separate from the display assembly 210 shown in FIG. 2, provides image light to another eye 225 of the user.

The display assembly 210 is configured to direct the image light to the eye 225 through the eye-box 220. In some embodiments, when the NED 100 is configured as an AR NED, the display assembly 210 also directs light from a local area surrounding the NED 100 to the eye 225 through the eye box 220. The display assembly 210 may be configured to emit image light at a particular focal distance in accordance with varifocal instructions, e.g., provided from a varifocal module (not shown in FIG. 2).

The display assembly 210 may be composed of one or more materials (e.g., plastic, glass, etc.) with one or more refractive indices that effectively minimize the weight and present to the user a field of view of the NED 100. In alternate configurations, the NED 100 includes one or more optical elements between the display assembly 210 and the eye 225. The optical elements may act to, e.g., correct aberrations in image light emitted from the display assembly 210, magnify image light, perform some other optical adjustment of image light emitted from the display assembly 210, or some combination thereof. The example for optical elements may include an aperture, a Fresnel lens, a convex lens, a concave lens, a liquid crystal lens, a diffractive element, a waveguide, a filter, a polarizer, a diffuser, a fiber taper, one or more reflective surfaces, a polarizing reflective surface, a birefringent element, or any other suitable optical element that affects image light emitted from the display assembly 210.

The DCA 115 mounted on the frame 105 includes a light source assembly 230, a camera assembly 240, and a controller 245 coupled to the light source assembly 230 and the camera assembly 240. In alternative embodiments (not shown in FIG. 2), the light source assembly 230 and the camera assembly 240 each may include its own internal controller. In some embodiments (not shown in FIG. 2), the light source assembly 230 and the camera assembly 240 can be separated, e.g., the light source assembly 230 and the camera assembly 240 can be located in different assemblies.

The light source assembly 230 may illuminate, e.g., through the illumination aperture 120, the local area with light in accordance with emission instructions generated by the controller 245. The light source assembly 230 may be configured to project pulses of light into the local area, wherein each pulse of light has a respective polarization type of a plurality of polarization types. In some embodiments, the light emitted by the light source assembly 230 is of linear polarization, and the respective polarization type of each pulse of light is related to an orientation of the linear polarized light. In some other embodiments, the light emitted by the light source assembly 230 is of circular or elliptical polarization. The respective polarization type of each pulse of light may related to a specific orientation of the circularly or elliptically polarized light. The light source assembly 230 may include a plurality of light sources, e.g., a two-dimensional array of light sources. Examples of light sources include but are not limited to: light-emitting diodes (LEDs), micro light-emitting diodes (μLEDs), micro super luminescent diodes (μSLDs), vertical-cavity surface-emitting lasers (VCSELs), micro resonant cavity light-emitting diodes (μRCLEDs), etc. Each light source in the light source assembly 230 may be configured to emit pulses of light of a polarization type of the plurality of polarization types, wherein the polarization type may be different for at least two of the plurality of light sources. Alternatively, the light source assembly 230 includes a single light source emitting the pulses of light, each pulse of light having a respective polarization type. In some embodiments, the light source assembly 230 includes projection optics that in-couples light from one or more sources of the light source assembly 230 and projects the light over at least a portion of the local area. More details about operation of the light source assembly 230 of the DCA 115 are disclosed in conjunction with FIG. 4 and FIG. 5.

The camera assembly 240 is configured to image a portion of the local area illuminated with the pulses of light. The camera assembly 240 may be configured to operate with a frame rate in the range of approximately 30 Hz to approximately 1 KHz for fast detection of objects in the local area. The camera assembly 240 includes a sensor (not shown in FIG. 2) having a plurality of augmented pixels for capturing light coming from the local area, e.g., through the imaging aperture 125. Each augmented pixel includes a plurality of gates, and at least some of the gates have a respective local storage location. An exposure interval of the camera assembly 240 may be divided into intervals and some of the intervals are synchronized to the pulses of light projected by the light source assembly 230 such that each respective local storage location of each augmented pixel stores image data associated with a different polarization type. More details about a structure and operation of the camera assembly 240 are disclosed in conjunction with FIGS. 3A-3B, FIG. 4 and FIG. 5.

The controller 245 may generate the emission instructions and provide the emission instructions to the light source assembly 230 for controlling operation of each individual light source in the light source assembly 230. The controller 245 may also generate capture instructions and provide the capture instructions to the camera assembly 240 to control timing of the intervals during which respective local storage locations of each augmented pixel in the sensor of the camera assembly 240 stores image data. The controller 245 may determine depth information for the local area based in part on the polarization types associated with the image data stored in the respective local storage locations of each augmented pixel in the sensor of the camera assembly 240.

The controller 245 may be configured to determine a surface normal associated with each augmented pixel, based on information about light intensities and polarization types stored as the image data in the respective local storage locations of that augmented pixel. The controller 245 may determine the depth information for the local area based in part on surface normals determined for at least a portion of the augmented pixels in the sensor of the camera assembly 240. Each surface normal is associated with a portion of the local area being imaged. The controller 245 may use the surface normal to determine a plane in 3D space that is tangent to the portion of the local area at a point of the local area being imaged. The controller 245 may combine adjacent tangent surfaces to determine the depth information for the local area (e.g., 3D shape of one or more objects in the local area). In one or more embodiments, the controller 245 stitches each of the tangent planes together to determine the 3D shape of the one or more objects in the local area. Additional details about depth determination using polarized light are discussed in U.S. application Ser. No. 15/808,758, filed Nov. 9, 2017, and is herein incorporated by reference in its entirety.

In some embodiments, the controller 245 provides the determined depth information to a console (not shown in FIG. 2) and/or an appropriate module of the NED 100 (e.g., a varifocal module, not shown in FIG. 2). The console and/or the NED 100 may utilize the depth information to, e.g., generate content for presentation on the display 110. More details about controlling operations of the light source assembly 230, the camera assembly 240 and determining depth information by the controller 245 are disclosed in conjunction with FIG. 4 and FIG. 5.

In some embodiments, the NED 100 further includes an eye tracker (not shown in FIG. 2) for determining and tracking a position of the eye 225, i.e., an angle and orientation of eye-gaze. Note that information about the position of the eye 225 also includes information about an orientation of the eye 225, i.e., information about user's eye-gaze. Based on the determined and tracked position and orientation of the eye 225, the NED 100 adjusts image light emitted from the display assembly 210. In some embodiments, the NED 100 adjusts focus of the image light and ensures that the image light is in focus at the determined angle of eye-gaze in order to mitigate the vergence-accommodation conflict. Additionally or alternatively, the NED 100 adjusts resolution of the image light by performing foveated rendering of the image light, based on the position of the eye 225. Additionally or alternatively, the NED 100 uses the information on a gaze position and orientation to provide contextual awareness for the user's attention, whether on real or virtual content. The eye tracker generally includes an illumination source and an imaging device (camera). In some embodiments, components of the eye tracker are integrated into the display assembly 210. In alternate embodiments, components of the eye tracker are integrated into the frame 105.

Figure 3A:
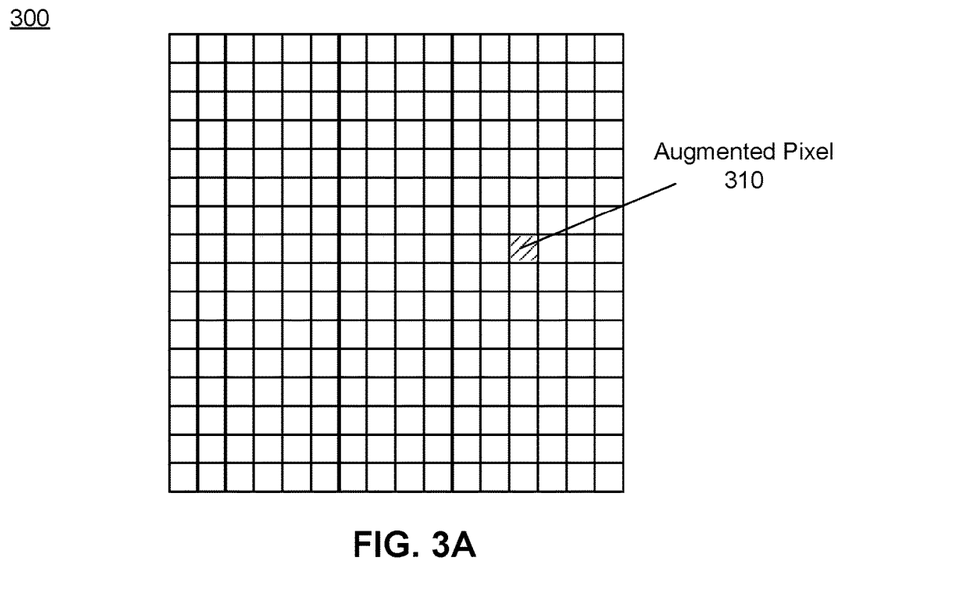
FIG. 3A is an example sensor having a plurality of augmented pixels, which may be part of the DCA in FIG. 2, in accordance with one or more embodiments

FIG. 3A is an example sensor 300 having a plurality of augmented pixels 310, in accordance with one or more embodiments. The sensor 300 may be part of the DCA 115, e.g., the sensor 300 may be integrated into the camera assembly 240 of the DCA 115 shown in FIG. 2. Alternatively, the sensor 300 may be implemented as part of some other camera assembly. The sensor 300 may capture, via the augmented pixels 310, light from a local area surrounding some or all of the NED 100. The light captured by the augmented pixels 310 of the sensor 300 may originate from light emitted by the light source assembly 230 of the DCA 115 and reflected from one or more objects in the local area, may originate from light emitted by some other light source (e.g., of the NED 100) and reflected from the local area, may originate from ambient light of the local area, or combination thereof. The augmented pixels 310 may be organized within the sensor 300 as a two-dimensional array of augmented pixels 310. While the sensor 300 illustrated in FIG. 3A is 16×16 sensor, in other embodiments the sensor 300 may have some other number of columns and/or rows. The sensor 300 can be generally described as an N×M sensor having N rows of augmented pixels 310 and M columns of augmented pixels 310.

Figure 3B:
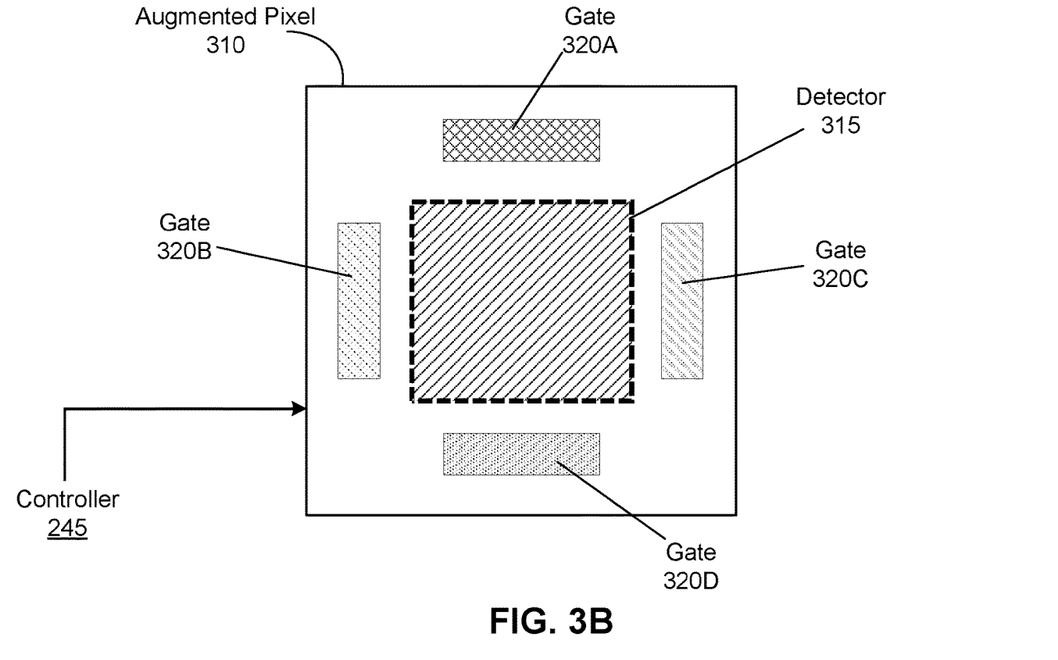
FIG. 3B is an example augmented pixel of the sensor in FIG. 3A, in accordance with one or more embodiments.

FIG. 3B is an example augmented pixel 310 of the sensor 300 in FIG. 3A, in accordance with one or more embodiments. The augmented pixel 310 captures, over multiple time intervals, intensities of light incident on a surface of the augmented pixel 310. The augmented pixel 310 includes a detector 315 and a plurality of gates, e.g., gates 320A, 320B, 320C, and 320D as shown in FIG. 3B. Although the augmented pixel 310 shown in FIG. 3B includes three gates, each augmented pixel 310 of the sensor 300 may include less than three gates (e.g., two gates) or more than three gates (e.g., four or five gates).

The detector 315 represents a photo-sensitive area of the augmented pixel 310. The detector 315 in-couples, e.g., through an aperture, photons of incident light and transforms the captured photons into electrons (charge). An appropriate electric field generated at a specific time interval based on, e.g., capture instructions from the controller 245, guides the charge from the detector 315 to a local storage location associated with a specific gate, e.g., the gate 320A, 320B, or 320C or to a ground that may be coupled to the gate 320D.

Some or all of the gates 320A, 320B, 320C, 320D have a respective local storage location for storing a charge related to light captured by the detector 315 at a specific time interval. For example, the gates 320A, 320B, 320C may all have different respective local storage locations. Each gate 320A, 320B, 320C, 320D functions as a switch that is biased to either pass or not pass the charge collected at the detector 315 to, e.g., a local storage area associated with the gate or a drain (e.g., ground). In some embodiments, at least one of the gates 320A, 320B, 320C, 320D operates as a drain gate and does not have a local storage location, and instead drops a charge (e.g., via a ground) received from the detector 315 while active. For example, the gate 320D may be implemented as a drain.

The respective local storage location of each gate 320A, 320B, 320C may be implemented as an analog electron storage area (e.g., a capacitor) for storing an analog charge generated from the light captured by the detector 315. In some embodiments, the respective local storage location of each gate 320A, 320B, 320C may be coupled to an analog-to-digital converter for converting the analog charge into digital information (i.e., a digital value quantifying an amount of analog charge). Note that in a single augmented pixel 310 there is a plurality of local storage locations that are each associated with a respective gate, and the local storage locations are all local to the single augmented pixel 310 and do not belong to any other augmented pixels 310. Thus, the local storage locations are associated with the particular augmented pixel 310, and they do not represent e.g., a memory bank separate from the sensor 300.

A respective local storage location of each gate 320A, 320B, 320C of the augmented pixel 310 may store image data of a different polarization type. The stored image data includes analog or digital information about a charge related to light captured by the detector 315 as well as information about a specific polarization type of the captured light. In some embodiments, light captured by the detector 315 is of linear polarization, and the respective polarization type is related to a polarization angle of the linear polarized light. For the illustrative embodiment shown in FIG. 3B where the three gates 320A, 320B, 320C are accompanied with local storage locations, a first local storage location associated with the gate 320A may store first image data for linear polarized light having the polarization angle of 0°; a second local storage location associated with the gate 320B may store second image data for linear polarized light having the polarization angle of 120°; and a third local storage location associated with the gate 320C may store third image data for linear polarized light having the polarization angle of 240°. In other embodiments where more gates are present, each non-drain gate is associated with a different polarization. In general, a set of polarization angles is based on a number of non-drain gates in an augmented pixel 310, i.e., the set of polarization angles can be defined as:

$$(i-1) \times \frac{360°}{G}, \quad (1)$$

where i=1, 2, . . . , G, and G is a total number of non-drain gates in the augmented pixel 310.

The controller 245 may be configured to determine depth information for the local area based in part on polarization types associated with the image data stored in respective local storage locations of the gates 320A, 320B, 320C. Details about timing control of the augmented pixel 310 for storing intensities of light (e.g., analog charges or digital values) having different polarization types in the respective local storage locations of the gates 320A, 320B, 320C are described in conjunction with FIG. 4. The controller 245 may be configured to determine a surface normal associated with each augmented pixel 310, based on information about light intensities and different polarization types stored as the image data in the respective local storage locations 320A, 320B, 320C of that augmented pixel 310. The controller 245 may determine the depth information for the local area based in part on surface normals determined for at least a portion of the augmented pixels 310 in the sensor 300, as described above with regard to FIG. 2.

Figure 4:
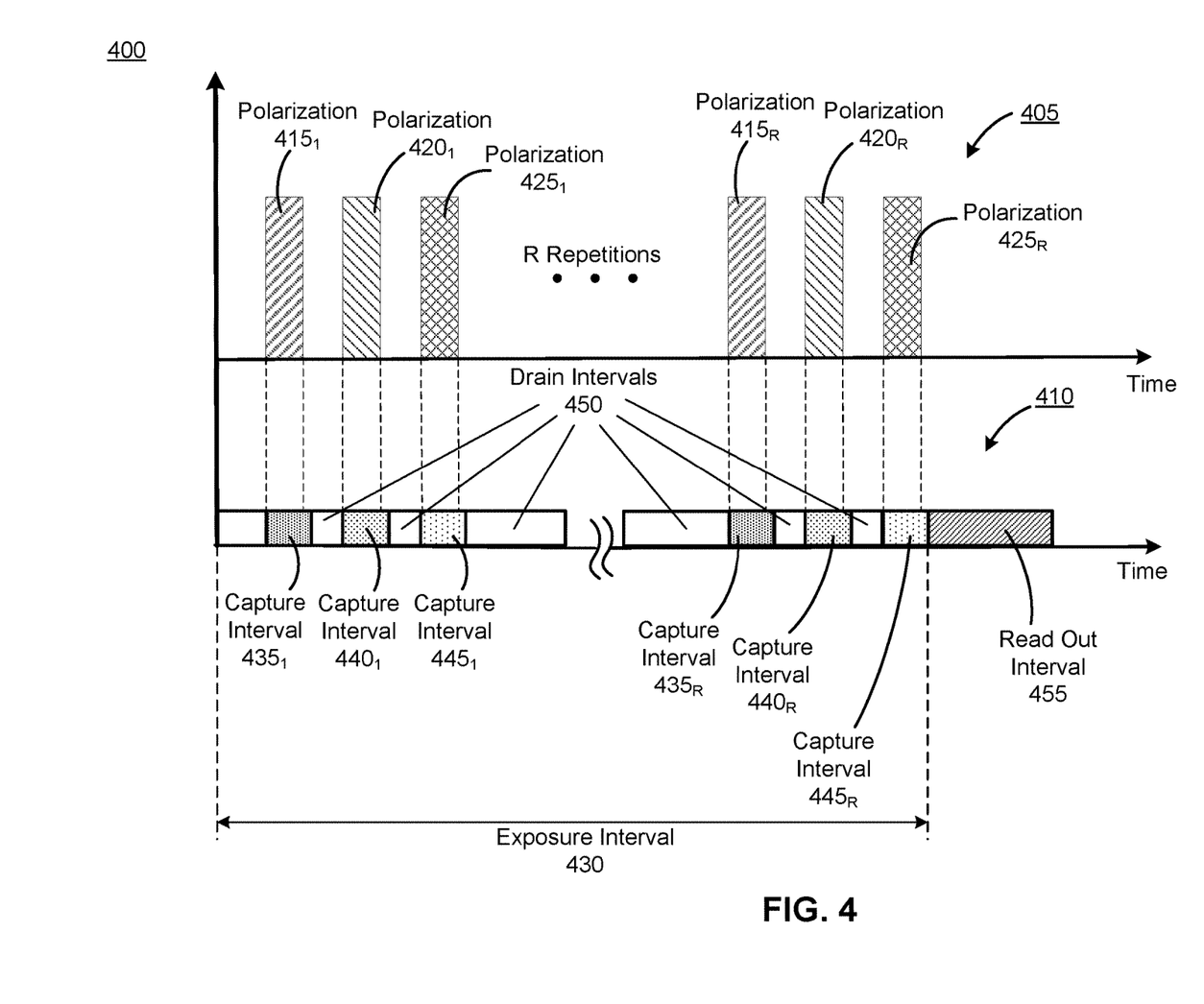
FIG. 4 is an example of timing control of operations of the DCA in FIG. 2 for determining depth information for a local area, in accordance with one or more embodiments.

FIG. 4 is an example 400 of timing diagrams 405 and 410, according to one or more embodiments. The timing diagrams 405, 410 relate to an embodiment for operating a DCA (e.g., the DCA 115).

The timing diagram 405 relates to operation of the light source assembly 230. The controller 245 may instruct the light source assembly 230 to project pulses of light into a local area, e.g., pulses of light $415_1$, $420_1$, $425_1$, ..., $415_R$, $420_R$, $425_R$, where R is an integer greater than one, as shown in FIG. 4. For example, the pulses of light may have a specific pulse rate. In some embodiments, each pulse of light has a respective polarization type of a plurality of polarization types, e.g., linear polarization with polarization angles of 0°, 120° and 240°, respectively. For example, the pulses of light $415_1$, ..., $415_R$ may be of a first polarization type (e.g., of linear polarization having a polarization angle of 0°), the pulses of light $420_1$, ..., $420_R$ may be of a second polarization type (e.g., of linear polarization having a polarization angle of) 120°, and the pulses of light $425_1$, ..., $425_R$ may be of a third polarization type (e.g., of linear polarization having a polarization angle of 240°). This operational mode of the light source assembly 230 can be referred to as an interleaved light emission. In some other embodiments, the projected pulses of light include at least two adjacent pulses that have the same polarization type during the exposure interval 430. For example, the pulses of light $415_1$, $420_1$, $425_1$ may be of the same polarization type, e.g., the first polarization type. Also, the pulses of light $415_R$, $420_R$, $425_R$ may be of the same polarization type, e.g., the third polarization type. This operational mode of the light source assembly 230 can be referred to as a non-interleaved light emission.

In some embodiments, the light source assembly 230 includes a plurality of light sources and each of the plurality of light sources are configured to emit pulses of light of a polarization type of the plurality of polarization types, and the polarization type is different for at least two of the plurality of light sources. In some embodiments, the light source assembly 230 may include three light sources, wherein a first light source emits the pulses of light $415_1$, ..., $415_R$ of the first polarization type; a second light source emits the pulses of light $420_1$, ..., $420_R$ of the second polarization type; and a third light source emits the pulses of light $425_1$, ..., $425_R$ of the third polarization type. In some other embodiments, the light source assembly 230 includes a single light source configured to emit light of different polarization types (e.g., based on an orientation of a polarizer coupled to the light source) in accordance with instructions from the controller 245.

The timing diagram 410 is a pixel timing diagram for an augmented pixel (e.g., the augmented pixel 310) of the camera assembly 240. The augmented pixel 310 may be configured to image, over an exposure interval 430, a portion of the local area illuminated with the pulses of light, e.g., the pulses of light $415_1$, $420_1$, $425_1$, ..., $415_R$, $420_R$, $425_R$. The exposure interval 430 may be divided into intervals that include capture intervals and drain intervals, e.g., capture intervals $435_1$, $440_1$, $445_1$, ..., $435_R$, $440_R$, $445_R$ and drain intervals 450, as shown in FIG. 4. At least portions of some of the intervals (i.e., the capture intervals) are synchronized to the projected pulses of light such that each respective local storage location of the augmented pixel 310 stores image data associated with a different polarization type of the plurality of polarization types.

The interleaved light emission can be first considered, which is illustrated in FIG. 4. In this case, the capture intervals $435_1$, ..., $435_R$ are synchronized to the respective projected pulses of light $415_1$, ..., $415_R$ having the first polarization type. During the capture intervals $435_1$, ..., $435_R$, one of the gates 320A, 320B, 320C (e.g., the gate 320A) may be activated to enable an associated local storage location to store image data (i.e., intensities of light) associated with the first polarization type, and the other gates (e.g., all but 320A) are inactive during the capture intervals $435_1$, ..., $435_R$. Similarly, as shown in FIG. 4, the capture intervals $440_1$, ..., $440_R$ are synchronized to the respective projected pulses of light $420_1$, ..., $420_R$ having the second polarization type. During the capture intervals $440_1$, ..., $440_R$, one of the gates 320A, 320B, 320C (e.g., the gate 320B) may be activated to enable an associated local storage location to store image data (i.e., intensities of light) associated with the second polarization type, and the other gates (e.g., all but 320B) are inactive during the capture intervals $440_1$, ..., $440_R$. Also, as shown in FIG. 4, the capture intervals $445_1$, ..., $445_R$ are synchronized to the respective projected pulses of light $425_1$, ..., $425_R$ having the third polarization type. During the capture intervals $445_1$, ..., $445_R$, one of the gates 320A, 320B, 320C (e.g., the gate 320C) may be activated to enable an associated local storage location to store image data (i.e., intensities of light) associated with the third polarization type, and the other gates (e.g., all but 320C) are inactive during the capture intervals $445_1$, ..., $445_R$.

In some other embodiments, for the interleaved light emission, the projected pulses of light include at least two adjacent pulses that have the same polarization type during the exposure interval 430. For example, the pulses of light $415_1$, $420_1$, $425_1$ may be of the same polarization type, e.g., the first polarization type. Also, the pulses of light $415_R$, $420_R$, $425_R$ may be of the same polarization type, e.g., the third polarization type. In this case, during the capture intervals $435_1$, $440_1$, $445_1$ only one of the gates 320A, 320B, 320C (e.g., the gate 320A) may be activated to enable an associated local storage location to store image data (i.e., intensities of light) associated with the first polarization type, and the other gates (e.g., all but 320A) are inactive during the capture intervals $435_1$, $440_1$, $445_1$. Also, during the capture intervals $435_R$, $440_R$, $445_R$ only one of the gates 320A, 320B, 320C (e.g., the gate 320C) may be activated to enable an associated local storage location to store image data (i.e., intensities of light) associated with the third polarization type, and the other gates (e.g., all but 320C) are inactive during the capture intervals $435_R$, $440_R$, $445_R$.

As shown in FIG. 4, the projected pulses of light may form a pulse train that repeats in a periodic manner, e.g., R times, where R is greater than one. The number of repetitions, R, may depend on a signal-to-noise ratio (SNR) associated with intensities of light stored in the local storage locations of the augmented pixel 310.

As shown in FIG. 4, drain intervals 450 occur between two capture intervals. During each of the drain intervals 450, the drain gate 320D of the augmented pixel 310 may be activated so that charges related to any light incident to a surface of the augmented pixel 310 during the drain interval 450 are not recorded. The drain interval 450 is placed between two capture intervals, e.g., the capture intervals $435_1$ and $440_1$, to prevent that image data related to portions of light having a particular polarization type (e.g., the first polarization type) are saved in two different local storage locations of two different gates (e.g., the gates 320A, 320B) of the augmented pixel 310. If, for example, the drain interval 450 was not inserted between the two capture intervals $435_1$ and $440_1$, a certain charge related to a portion of light of the first polarization type (e.g., reflected from a distant object in the local area) might be saved during a portion of the capture interval $440_1$ in a local storage location associated with the second polarization type. The drain interval 450 inserted between the two capture intervals $435_1$ and $440_1$ allows for enough time to pass such that all portions of light of the first polarization type that originate from the projected pulse of light $415_1$ have already reached the detector 315 of the augmented pixel 310.

The timing diagram 410 can be replicated for each augmented pixel (e.g., the augmented pixel 310) of the camera assembly 240. Corresponding local storage locations of each augmented pixel of the camera assembly 240 may store information related to image data associated with the plurality of polarization types. The information may be stored in the local storage locations of each augmented pixel during capture intervals synchronized with the pulses of light $415_1$, $420_1$, $425_1$, . . . , $415_R$, $420_R$, $425_R$.

After the exposure interval 430, e.g., during a read out interval 455, the controller 245 initiates read-out of the image data stored in the local storage locations of each augmented pixel of the camera assembly 240. The controller 245 obtains the stored image data and generates a set of images that each correspond to a different polarization type. The controller 245 may then determine the depth information for the local area using the set of images and information about a respective polarization type of each image in the set, as described above with regard to FIG. 2. Note that, for the interleaved light emission, as all the local storage locations associated with their respective gates of each augmented pixel of the camera assembly 240 are read out once after the exposure interval 430, the motion blur is reduced when determining depth information related to, e.g., a fast moving object in the local area. Furthermore, for both the interleaved and non-interleaved light emissions, as all the local storage locations associated with their respective gates of each augmented pixel of the camera assembly 240 are read once per exposure interval 430, a speed of the DCA 115 is faster than that of conventional polarization-based DCAs.

Figure 5:
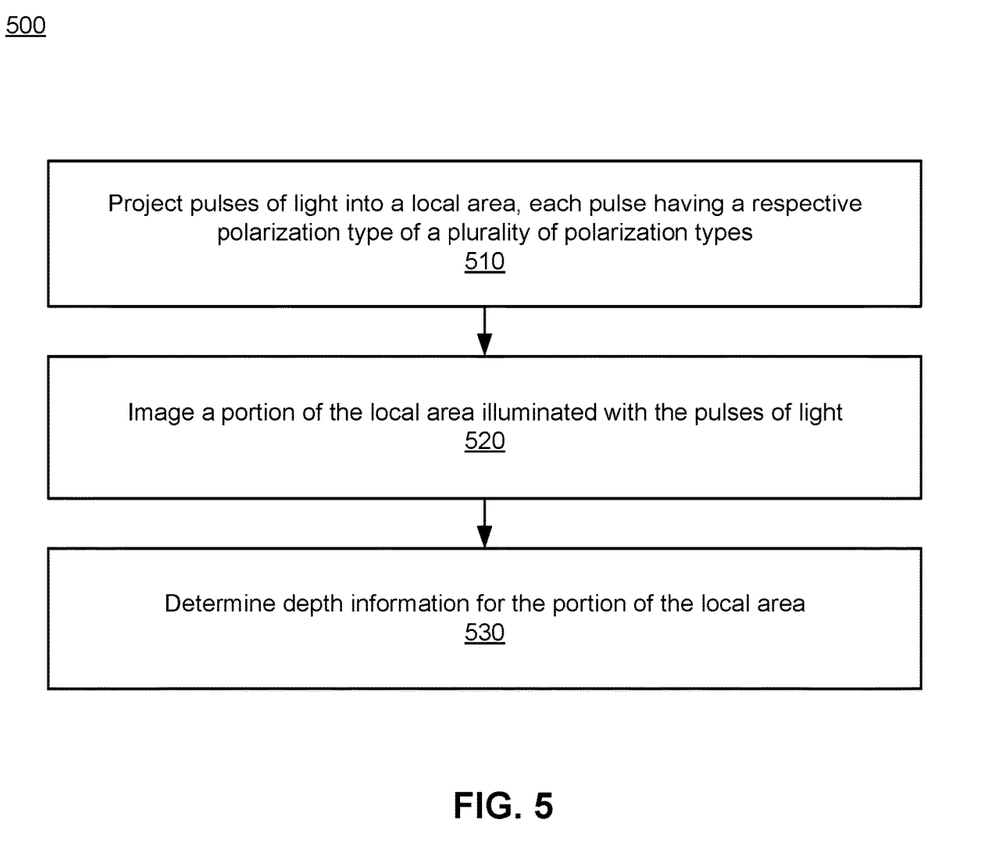
FIG. 5 is a flow chart illustrating a process of determining depth information for a local area, in accordance with one or more embodiments.

FIG. 5 is a flow chart illustrating a process 500 of determining depth information for a local area, which may be implemented at the NED 100 shown in FIG. 1, in accordance with one or more embodiments. The process 500 of FIG. 5 may be performed by the components of a DCA, e.g., the DCA 115 of FIGS. 1-2. Other entities (e.g., a NED and/or console) may perform some or all of the steps of the process in other embodiments. Likewise, embodiments may include different and/or additional steps, or perform the steps in different orders.

The DCA projects 510 (e.g., via a light source assembly) pulses of light into a local area, each pulse having a respective polarization type of a plurality of polarization types (e.g., polarization types having polarization angles of 0°, 120°, 240°). In one embodiment, adjacent pulses in the pulses of light have different polarization types during an exposure interval of the DCA, which refers to as the interleaved light emission. Also, the pulses of light may form a pulse train that repeats in a periodic manner. In another embodiment, the pulses of light include at least two adjacent pulses that have the same polarization type during the exposure interval of the DCA, which refers to as the non-interleaved light emission.

The DCA images 520 a portion of the local area illuminated with the pulses of light. The DCA images the portion of the local area using a camera assembly (e.g., the camera assembly 240). The camera assembly includes a plurality of augmented pixels, and each augmented pixel has a plurality of gates and at least some of the gates have a respective local storage location. An exposure interval of the DCA may be divided into intervals and some of the intervals (e.g., capture intervals) are synchronized to the projected pulses of light such that each respective local storage location stores image data associated with the different polarization type.

The DCA determines 530 (e.g., via a controller) depth information for the portion of the local area. The DCA determined depth information for the portion of the local area based in part on the polarization types associated with the image data stored in respective local storage locations. The DCA (e.g., via the controller) reads out, after the exposure interval of the DCA, the image data stored in the local storage locations of the augmented pixels, to generate a set of images that each correspond to a different polarization type. The DCA determines the depth information using the set of images.

System Environment

Figure 6:
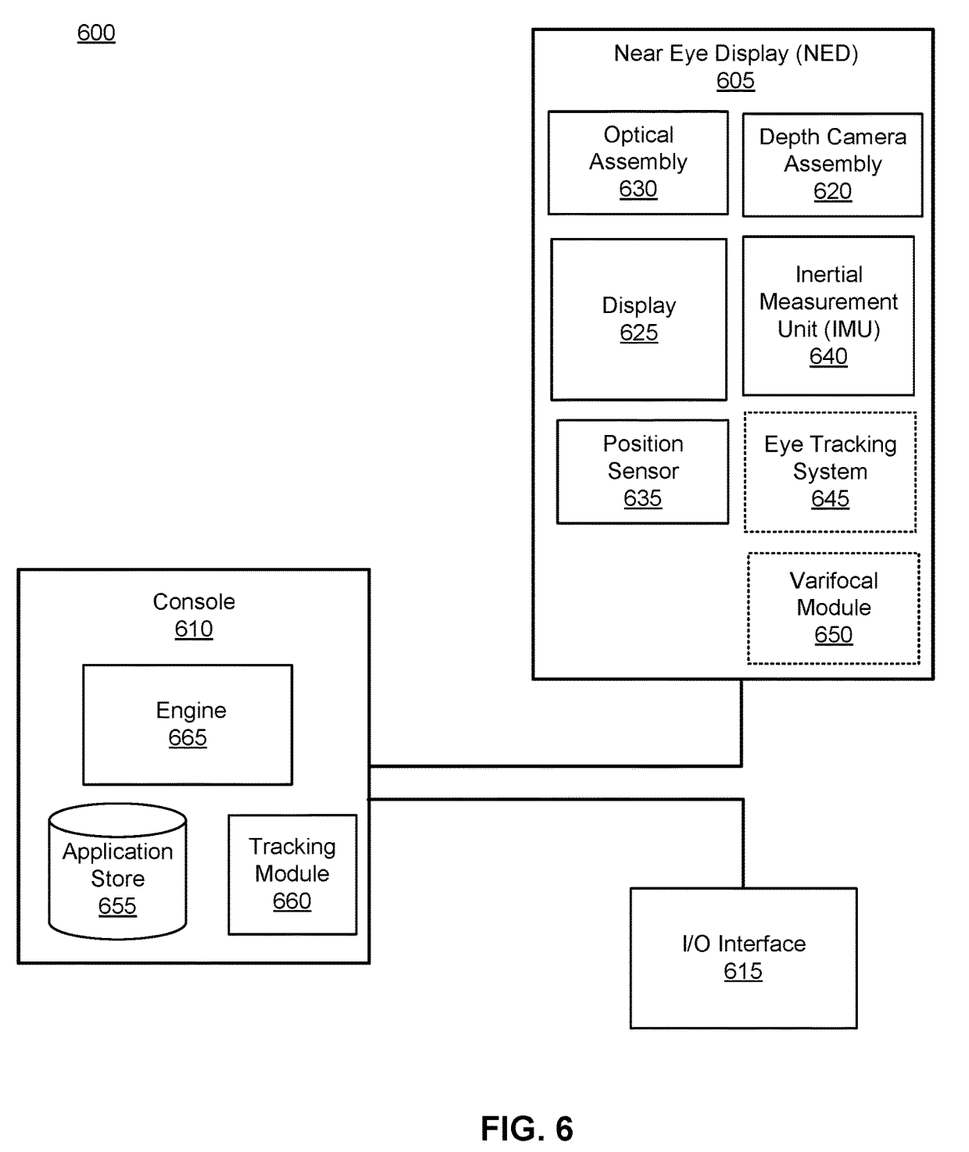
FIG. 6 is a block diagram of a system environment that includes a NED, in accordance with one or more embodiments.

FIG. 6 is a block diagram of one embodiment of a NED system 600, in accordance with one or more embodiments. The NED system 600 may operate in an artificial reality system environment, e.g., a VR system environment, an AR system environment, a MR system environment, or some combination thereof. The NED system 600 shown by FIG. 6 comprises a NED 605 and an input/output (I/O) interface 615 that is coupled to the console 610. While FIG. 6 shows an example NED system 600 including one NED 605 and on I/O interface 615, in other embodiments any number of these components may be included in the NED system 600. For example, there may be multiple NEDs 605 each having an associated I/O interface 615, with each NED 605 and I/O interface 615 communicating with the console 610. In alternative configurations, different and/or additional components may be included in the NED system 600. Additionally, functionality described in conjunction with one or more of the components shown in FIG. 6 may be distributed among the components in a different manner than described in conjunction with FIG. 6 in some embodiments. For example, some or all of the functionality of the console 610 is provided by the NED 605.

The NED 605 is a near-eye display or a head-mounted display that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the NED 605, the console 610, or both, and presents audio data based on the audio information.

The NED 605 may include a DCA 620, a display 625, an optical assembly 630, one or more position sensors 635, an IMU 640, an optional eye tracking system 645, and an optional varifocal module 650. Some embodiments of the NED 605 have different components than those described in conjunction with FIG. 6. Additionally, the functionality provided by various components described in conjunction with FIG. 6 may be differently distributed among the components of the NED 605 in other embodiments.

The DCA 620 illuminates a portion of a local area with pulses of light having different polarization types and determines depth information for the local area based on captured light reflected from the local area having different polarization types. The DCA 620 includes a light source assembly, a camera assembly, and a controller. The light source assembly of the DCA 620 is configured to project pulses of light into the local area, wherein each pulse of light has a respective polarization type of a plurality of polarization types. The camera assembly of the DCA 620 is configured to image a portion of the local area illuminated with the pulses of light. The camera assembly includes a plurality of augmented pixels, wherein each augmented pixel has a plurality of gates and at least some of the gates have a respective local storage location. An exposure interval of the camera assembly is divided into intervals and some of the intervals are synchronized to the projected pulses of light such that each respective local storage location stores image data associated with a different polarization type. The controller of the DCA 620 is configured to determine depth information for the local area based in part on the polarization types associated with the image data stored in respective local storage locations. An embodiment of the DCA 620 is the DCA 115 described in conjunction with FIG. 1, FIG. 2 and FIGS. 3A-3B.

The display 625 displays two-dimensional or three-dimensional images to the user in accordance with data received from the console 610. In various embodiments, the display 625 comprises a single display or multiple displays (e.g., a display for each eye of a user). Examples of the electronic display 625 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, some other display, a scanner, one-dimensional array, or some combination thereof. Content displayed on the display 625 may include the depth information determined by the DCA 620. An embodiment of the display 625 is the display assembly 210 described above in conjunction with FIG. 2.

The optical assembly 630 magnifies image light received from the display 625, corrects optical errors associated with the image light, and presents the corrected image light to a user of the NED 605. The optical assembly 630 includes a plurality of optical elements. Example optical elements included in the optical assembly 630 include: an aperture, a Fresnel lens, a convex lens, a concave lens, a filter, a reflecting surface, or any other suitable optical element that affects image light. Moreover, the optical assembly 630 may include combinations of different optical elements. In some embodiments, one or more of the optical elements in the optical assembly 630 may have one or more coatings, such as partially reflective or anti-reflective coatings.

Magnification and focusing of the image light by the optical assembly 630 allows the display 625 to be physically smaller, weigh less and consume less power than larger displays. Additionally, magnification may increase the field of view of the content presented by the display 625. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 630 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the display 625 for display is pre-distorted, and the optical assembly 630 corrects the distortion when it receives image light from the display 625 generated based on the content.

The IMU 640 is an electronic device that generates data indicating a position of the NED 605 based on measurement signals received from one or more of the position sensors 635 and from depth information received from the DCA 620. A position sensor 635 generates one or more measurement signals in response to motion of the NED 605. Examples of position sensors 635 include: one or more accelerometers, one or more gyroscopes, one or more magnetometers, another suitable type of sensor that detects motion, a type of sensor used for error correction of the IMU 640, or some combination thereof. The position sensors 635 may be located external to the IMU 640, internal to the IMU 640, or some combination thereof.

Based on the one or more measurement signals from one or more position sensors 635, the IMU 640 generates data indicating an estimated current position of the NED 605 relative to an initial position of the NED 605. For example, the position sensors 635 include multiple accelerometers to measure translational motion (forward/back, up/down, left/right) and multiple gyroscopes to measure rotational motion (e.g., pitch, yaw, roll). In some embodiments, the IMU 640 rapidly samples the measurement signals and calculates the estimated current position of the NED 605 from the sampled data. For example, the IMU 640 integrates the measurement signals received from the accelerometers over time to estimate a velocity vector and integrates the velocity vector over time to determine an estimated current position of a reference point on the NED 605. Alternatively, the IMU 640 provides the sampled measurement signals to the console 610, which interprets the data to reduce error. The reference point is a point that may be used to describe the position of the NED 605. The reference point may generally be defined as a point in space or a position related to the NED's 605 orientation and position.

The IMU 640 receives one or more parameters from the console 610. The one or more parameters are used to maintain tracking of the NED 605. Based on a received parameter, the IMU 640 may adjust one or more IMU parameters (e.g., sample rate). In some embodiments, certain parameters cause the IMU 640 to update an initial position of the reference point so it corresponds to a next position of the reference point. Updating the initial position of the reference point as the next calibrated position of the reference point helps reduce accumulated error associated with the current position estimated the IMU 640. The accumulated error, also referred to as drift error, causes the estimated position of the reference point to "drift" away from the actual position of the reference point over time. In some embodiments of the NED 605, the IMU 640 may be a dedicated hardware component. In other embodiments, the IMU 640 may be a software component implemented in one or more processors.

In some embodiments, the eye tracking system 645 is integrated into the NED 605. The eye tracking system 645 determines eye tracking information associated with an eye of a user wearing the NED 605. The eye tracking information determined by the eye tracking system 645 may comprise information about a position of the user's eye, i.e., information about an angle of an eye-gaze. The eye-tracking system 645 may comprise one or more illumination sources and an imaging device (camera).

In some embodiments, the varifocal module 650 is further integrated into the NED 605. The varifocal module 650 may be coupled to the eye tracking system 645 to obtain eye tracking information determined by the eye tracking system 645. The varifocal module 650 may be configured to adjust focus of image light emitted from the display 625, based on the determined eye tracking information obtained from the eye tracking system 645. In this way, the varifocal module 650 can mitigate vergence-accommodation conflict in relation to the image light. The varifocal module 650 can be interfaced (e.g., either mechanically or electrically) with at least one optical element of the optical assembly 630. Then, the varifocal module 650 may be configured to adjust focus of the image light emitted from the display 625 and propagated through the optical assembly 630 by adjusting an optical position of the at least one optical element of the optical assembly 630, based on the determined eye tracking information obtained from the eye tracking system 645. By adjusting the optical position, the varifocal module 650 varies focus of the image light propagated through the optical assembly 630 towards the user's eye. The varifocal module 650 may be also configured to adjust resolution of the image light emitted by the display 625 by performing foveated rendering of the image light, based at least in part on the determined eye tracking information obtained from the eye tracking system 645. In this case, the varifocal module 650 provides appropriate image signals to the display 625. The varifocal module 650 provides image signals with a maximum pixel density for the display 625 only in a foveal region of the user's eye-gaze, while providing image signals with lower pixel densities in other regions.

The I/O interface 615 is a device that allows a user to send action requests and receive responses from the console 610. An action request is a request to perform a particular action. For example, an action request may be an instruction to start or end capture of image or video data or an instruction to perform a particular action within an application. The I/O interface 615 may include one or more input devices. Example input devices include: a keyboard, a mouse, a game controller, or any other suitable device for receiving action requests and communicating the action requests to the console 610. An action request received by the I/O interface 615 is communicated to the console 610, which performs an action corresponding to the action request. In some embodiments, the I/O interface 615 includes an IMU 640 that captures calibration data indicating an estimated position of the I/O interface 615 relative to an initial position of the I/O interface 615. In some embodiments, the I/O interface 615 may provide haptic feedback to the user in accordance with instructions received from the console 610. For example, haptic feedback is provided when an action request is received, or the console 610 communicates instructions to the I/O interface 615 causing the I/O interface 615 to generate haptic feedback when the console 610 performs an action.

The console 610 provides content to the NED 605 for processing in accordance with information received from one or more of: the DCA 620, the NED 605, and the I/O interface 615. In the example shown in FIG. 6, the console 610 includes an application store 655, a tracking module 660, and an engine 665. Some embodiments of the console 610 have different modules or components than those described in conjunction with FIG. 6. Similarly, the functions further described below may be distributed among components of the console 610 in a different manner than described in conjunction with FIG. 6.

The application store 655 stores one or more applications for execution by the console 610. An application is a group of instructions, that when executed by a processor, generates content for presentation to the user. Content generated by an application may be in response to inputs received from the user via movement of the NED 605 or the I/O interface 615. Examples of applications include: gaming applications, conferencing applications, video playback applications, or other suitable applications.

The tracking module 660 calibrates the NED system 600 using one or more calibration parameters and may adjust one or more calibration parameters to reduce error in determination of the position of the NED 605 or of the I/O interface 615. For example, the tracking module 660 communicates a calibration parameter to the DCA 620 to adjust the focus of the DCA 620 to more accurately determine depth information for the local area. Calibration performed by the tracking module 660 also accounts for information received from the IMU 640 in the NED 605 and/or an IMU 640 included in the I/O interface 615. Additionally, if tracking of the NED 605 is lost, the tracking module 660 may re-calibrate some or all of the NED system 600.

The tracking module 660 tracks movements of the NED 605 or of the I/O interface 615 using information from the DCA 620, the one or more position sensors 635, the IMU 640 or some combination thereof. For example, the tracking module 660 determines a position of a reference point of the NED 605 in a mapping of a local area based on information from the NED 605. The tracking module 660 may also determine positions of the reference point of the NED 605 or a reference point of the I/O interface 615 using data indicating a position of the NED 605 from the IMU 640 or using data indicating a position of the I/O interface 615 from an IMU 640 included in the I/O interface 615, respectively. Additionally, in some embodiments, the tracking module 660 may use portions of data indicating a position or the NED 605 from the IMU 640 as well as representations of the local area from the DCA 620 to predict a future location of the NED 605. The tracking module 660 provides the estimated or predicted future position of the NED 605 or the I/O interface 615 to the engine 665.

The engine 665 generates a three-dimensional mapping of the area surrounding the NED 605 (i.e., the "local area") based on information received from the NED 605. In some embodiments, the engine 665 determines depth information for the three-dimensional mapping of the local area based on information received from the DCA 620 that is relevant for techniques used in computing depth. The engine 665 may calculate depth information for the local area based in part on the polarization types associated with the image data stored in respective local storage locations of each augmented pixel of the DCA 620. In various embodiments, the engine 665 uses the depth information to, e.g., update a model of the local area, and generate content based in part on the updated model.

The engine 665 also executes applications within the NED system 600 and receives position information, acceleration information, velocity information, predicted future positions, or some combination thereof, of the NED 605 from the tracking module 660. Based on the received information, the engine 665 determines content to provide to the NED 605 for presentation to the user. For example, if the received information indicates that the user has looked to the left, the engine 665 generates content for the NED 605 that mirrors the user's movement in a virtual environment or in an environment augmenting the local area with additional content. Additionally, the engine 665 performs an action within an application executing on the console 610 in response to an action request received from the I/O interface 615 and provides feedback to the user that the action was performed. The provided feedback may be visual or audible feedback via the NED 605 or haptic feedback via the I/O interface 615.

In some embodiments, based on the eye tracking information (e.g., orientation of the user's eye) received from the eye tracking system 645, the engine 665 determines resolution of the content provided to the NED 605 for presentation to the user on the display 625. The engine 665 may be configured to adjust resolution of the content provided to the NED 605 by performing foveated rendering of the presented content, based at least in part on the determined eye tracking information obtained from the eye tracking system 645. The engine 665 provides the content to the NED 605 having a maximum resolution on the display 625 in a foveal region of the user's gaze, whereas the engine 665 provides a lower resolution in other regions, thus achieving less power consumption at the NED 605 and saving computing cycles of the console 610 without compromising a visual experience of the user. In some embodiments, the engine 665 can further use the eye tracking information to adjust focus of the image light emitted from the display 625 to prevent the vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
    a light source assembly configured to project pulses of light into a local area, wherein each pulse of light has a respective polarization type of a plurality of polarization types and is emitted during a respective different time period;
    a camera assembly configured to image a portion of the local area illuminated with the pulses of light, the camera assembly including a plurality of augmented pixels, each augmented pixel having a plurality of gates and at least two of the gates have a respective local storage location, wherein an exposure interval of the camera assembly is divided into intervals and some of the intervals are synchronized to the projected pulses of light such that each respective local storage location for the augmented pixel stores image data associated with a different polarization type of the plurality of polarization types; and
    a controller configured to determine depth information for the local area based in part on the polarization types associated with the image data stored in the respective local storage locations.

2. The DCA of claim 1, wherein the controller is further configured to:
    read out, after the exposure interval of the camera assembly, the image data stored in the local storage locations of the augmented pixels, to generate a set of images that each correspond to the different polarization type; and
    determine the depth information using the set of images.

3. The DCA of claim 1, wherein adjacent pulses in the pulses of light have different polarization types of the plurality of polarization types during the exposure interval.

4. The DCA of claim 3, wherein the pulses of light form a pulse train that repeats in a periodic manner.

5. The DCA of claim 1, wherein the pulses of light include at least two adjacent pulses that have the same polarization type of the plurality of polarization types during the exposure interval.

6. The DCA of claim 1, wherein one or more of the plurality of gates comprises a drain gate.

7. The DCA of claim 6, wherein the intervals include capture intervals and drain intervals, and the controller is further configured to:

enable, during a drain interval between two capture intervals, activation of the drain gate.

8. The DCA of claim 1, wherein the light source assembly includes a plurality of light sources and each of the plurality of light sources are configured to emit pulses of light of a polarization type of the plurality of polarization types, and the polarization type is different for at least two of the plurality of light sources.

9. The DCA of claim 1, wherein the controller is further configured to:
synchronize emission of each of the pulses of light with activation of corresponding gates in each of the augmented pixels, such that image data associated with a pulse of light of a polarization type of the plurality of polarization types is stored in one or more local storage locations associated with the polarization type.

10. The DCA of claim 1, wherein the DCA is part of a headset.

11. A method comprising:
instructing a light source assembly to project pulses of light into a local area, wherein each pulse of light has a respective polarization type of a plurality of polarization types and is emitted during a respective different time period;
instructing a camera assembly to image a portion of the local area illuminated with the pulses of light, the camera assembly including a plurality of augmented pixels, each augmented pixel having a plurality of gates and at least two of the gates have a respective local storage location, wherein an exposure interval of the camera assembly is divided into intervals and some of the intervals are synchronized to the projected pulses of light such that each respective local storage location for the augmented pixel stores image data associated with a different polarization type of the plurality of polarization types; and
determining depth information for the local area based in part on the polarization types associated with the image data stored in the respective local storage locations.

12. The method of claim 11, further comprising:
reading out, after the exposure interval of the camera assembly, the image data stored in the local storage locations of the augmented pixels, to generate a set of images that each correspond to the different polarization type; and
determining the depth information using the set of images.

13. The method of claim 11, wherein adjacent pulses in the pulses of light have different polarization types of the plurality of polarization types during the exposure interval.

14. The method of claim 13, wherein the pulses of light form a pulse train that repeats in a periodic manner.

15. The method of claim 11, wherein the pulses of light include at least two adjacent pulses that have the same polarization type of the plurality of polarization types during the exposure interval.

16. The method of claim 11, wherein one or more of the plurality of gates comprises a drain gate, the intervals include capture intervals and drain intervals, and the method further comprising:
enabling, during a drain interval between two capture intervals, activation of the drain gate.

17. The method of claim 11, further comprising
synchronizing emission of each of the pulses of light with activation of corresponding gates in each of the augmented pixels, such that image data associated with a pulse of light of a polarization type of the plurality of polarization types is stored in one or more local storage locations associated with the polarization type.

18. A method comprising:
projecting, via a light source assembly, pulses of light into a local area, wherein each pulse of light has a respective polarization type of a plurality of polarization types and is emitted during a respective different time period;
imaging, via a camera assembly, a portion of the local area illuminated with the pulses of light, the camera assembly including a plurality of augmented pixels, each augmented pixel having a plurality of gates and at least two of the gates have a respective local storage location, wherein an exposure interval of the camera assembly is divided into intervals and some of the intervals are synchronized to the projected pulses of light such that each respective local storage location for the augmented pixel stores image data associated with a different polarization type of the plurality of polarization types; and
determining depth information for the local area based in part on the polarization types associated with the image data stored in the respective local storage locations.

19. The method of claim 18, further comprising:
reading out, after the exposure interval of the camera assembly, the image data stored in the local storage locations of the augmented pixels, to generate a set of images that each correspond to a different polarization type of the plurality of polarization types; and
determining the depth information using the set of images.

20. The method of claim 18, further comprising
synchronizing emission of each of the pulses of light with activation of corresponding gates in each of the augmented pixels, such that image data associated with a pulse of light of a polarization type of the plurality of polarization types is stored in local storage areas associated with the polarization type.

* * * * *